(No Model.)
G. H. BLANCHARD.
BREAD KNIFE.
No. 595,597. Patented Dec. 14, 1897.
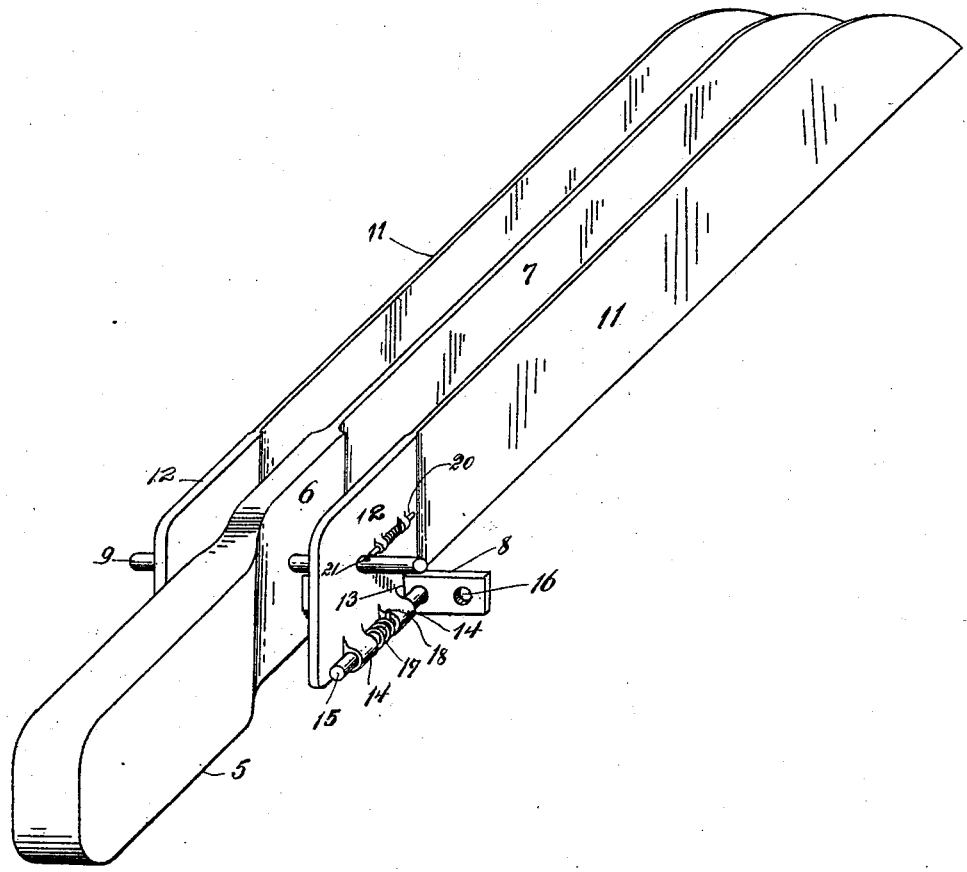
WITNESSES
INVENTOR
George H. Blanchard
BY
ATTORNEYS.

UNITED STATES PATENT OFFICE.

GEORGE HENRY BLANCHARD, OF DAVENPORT, IOWA.

BREAD-KNIFE.

SPECIFICATION forming part of Letters Patent No. 595,597, dated December 14, 1897.

Application filed April 7, 1897. Serial No. 631,053. (No model.)

*To all whom it may concern:*

Be it known that I, GEORGE HENRY BLANCHARD, a citizen of the United States, residing at Davenport, in the county of Scott and State of Iowa, have invented certain new and useful Improvements in Bread-Knives, of which the following is a full and complete specification, such as will enable those skilled in the art to which it appertains to make and use the same.

This invention relates to bread-knives; and the object thereof is to provide an improved knife for cutting bread, cake, and other articles which is provided with a plurality of blades, one or more of which may be used when desired.

The invention is fully disclosed in the following specification, of which the accompanying drawing forms a part, said drawing being a perspective view of my improved knife.

In the drawing forming part of this specification the separate parts of my improvement are designated by numerals of reference, and in the practice of my invention I provide a knife for the purpose herein specified which comprises a handle 5, on which is formed or to which is secured a shank 6, and the shank 6 is provided with a blade 7. This shank is preferably oblong in form and substantially as wide as the blade 7, and passing through the lower corner thereof, adjacent to the blade 7, is a bar 8, and passing centrally through said shank is a shaft 9. I also provide two supplemental blades 11, one of which is mounted on each side of the main blade 7, and these supplemental blades are provided with shanks 12, which are similar in form to the shank 6 of the main blade, and formed in the lower corners of each of said shanks adjacent to the blade is a notch or recess 13, through which the bar 8 passes, and the supplemental shanks 12 are provided with keepers 14, through which passes a bolt 15, which is adapted to engage with corresponding holes or openings 16 in the bar 8, and mounted between the keepers 14 is a spiral spring 17, the outer end of which bears on the outer keeper and the inner end of which bears on a pin 18, secured in said bolt.

The springs 17 serve to force the bolts 15 inwardly through the bar 8, and the operation will be readily understood from the foregoing description when taken in connection with the accompanying drawing and the following statement thereof.

The supplemental blades 11, when not locked in connection with the bar 8 by the bolts 15, are adapted to be swung on the shaft 9, as will be readily understood, and said supplemental blades may be locked parallel with the main blade 7, whenever desired, by means of the bolts 9 and the bar 8, and it will thus be seen that the main blade 7 may be used separately or in connection with either or both of the supplemental blades. The shanks 12 of the supplemental blades are also each provided with longitudinally-movable spring-operated bolts 20, which are adapted to operate in connection with corresponding holes or openings 21 in the upper side of the shaft 9, and said blades may thus be locked in an upright position when not required for use.

By means of my improved knife a loaf of bread may be quickly and easily sliced, a plurality of slices being produced by each operation of the knife, and my improved knife may be used for cutting cake and various other articles.

My improvement is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A knife for cutting bread, cake and other articles, comprising a handle, a blade connected therewith, by means of a shank which is formed on or connected with the handle, a bar passing through said shank and provided with holes or openings, a shaft passing through said shank, supplemental blades provided with shanks through which said shaft and bar also pass, and bolts connected with the shanks of the supplemental blades and adapted to enter the holes or openings formed in said bar, substantially as shown and described.

2. A knife for cutting bread, cake and other articles, comprising a handle, a blade connected therewith, by means of a shank which is formed on or connected with the handle, a bar passing through said shank and provided with holes or openings, a shaft passing through said shank, supplemental blades provided with shanks through which said shaft and bar also pass, and bolts connected with the shanks of the supplemental blades and adapted to enter the holes or openings formed in the bar, said bolts being spring-operated, and being mounted in keepers formed on or secured to the shanks of the supplemental blades, substantially as shown and described.

In testimony that I claim the foregoing as my invention I have signed my name, in presence of the subscribing witnesses, this 31st day of March, 1897.

GEORGE HENRY BLANCHARD.

Witnesses:
C. F. LYMAN,
GUY DAVENPORT DOUD.